United States Patent Office 3,594,181
Patented July 20, 1971

3,594,181
PROCESS OF UTILIZING MUSTARD AND RAPE SEEDS AS DOUGH IMPROVING AGENTS
Albert Alpin, 153 Overdale Road, Bredbury Green, Romiley, near Stockport, Cheshire, England
No Drawing. Filed May 28, 1968, Ser. No. 732,535
Claims priority, application Great Britain, July 19, 1967, 23,556/67
Int. Cl. A21d 2/36
U.S. Cl. 99—91
3 Claims

ABSTRACT OF THE DISCLOSURE

Comminuted non-toxic plants of the family Cruciferae, Resedaceae, Capparidaceae, or Tropaeolaceae, especially ground white mustard seed, having a valuable improving action, generally similar to that of cysteine, as improvers for wheat flour in the making of bread and like comestibles.

---

This invention relates to making comestibles based on wheat flour, especially bread (whether white bread, brown bread, wheatmeal bread, wheat germ bread, wholemeal bread, soda bread, or mechanically aerated bread, and including rolls, baps, fancy loaves and specialty bread), but including also pastries, cakes, buns, biscuits, crumpets, pikelets, muffins, drop scones, rusks, and other comestibles of a like nature.

The properties of the protein of wheat flour, called gluten, play a crucial role in the production of all kinds of baked or otherwise cooked comestibles having a basis of wheat flour. In bread making, for example, the dough formed by mixing wheat flour with water goes through a process of maturation, called development, in which gluten plays an essential part, which must be properly controlled if bread of acceptable quality is to be obtained. When the dough is first mixed, it should be easily workable (fissile) so that thorough mixing is possible and bread of fine even texture is obtained. During development, the dough becomes stronger and more elastic, which is essential if loaves of good volume (i.e. good gas retention) and crust quality are to be obtained. It is believed (though the present invention does not depend on the truth of any theory) that, in the initial mixing of the dough, disulphide linkages (—S—S—) in the gluten are broken, leading to a reduction in its molecular weight and consequently greater fissility. During development, the disulphide linkages reform causing a degree of stabilization or "setting" of the dough and increase in its strength and elasticity.

Both these changes take place in traditional methods of breadmaking which however suffer from the disadvantage that the process of fermentation and maturation takes a long time, which is intrinsically undesirable and may cause unwanted side-effects to appear in the dough. Considerable research has, therefore, been devoted to speeding up bread manufacture without sacrifice of quality, and two procedures have been widely adopted. In one process, used in the United Kingdom, high power mixing machines are used which by a high energy input reduce the bread gluten mechanically, and at the same time chemical oxidants are added to promote maturation. The most commonly used oxidant agents are ascorbic acid, which has a rapid action, and potassium bromate (or, in some countries, iodate) which acts more slowly. These two oxidants are often used together. This process is much more rapid than traditional breadmaking but requires very powerful mixers and the consumption of large amounts of power.

In the other process, used in the United States and elsewhere, chemical reducing agents are added to the dough, as dough activators, in conjunction with the aforesaid chemical oxidants. These reducing agents are believed to speed the breaking of the disulphide linkages, while the oxidants promote their subsequent reformation in the manner already described. The reducing agent generally used in this process is cysteine. This procedure also avoids a lengthy fermentation time.

Similar changes in the structure of the wheat gluten to those already discussed are believed to take place in the manufacture of other comestibles based on wheat flour, whether the initial mix is relatively dry, as in biscuit doughs and short pastry and puff pastry, or so wet as to be pourable (batter), as in the making of crumpets. In the case of biscuit doughs and pastries the initial breaking (or reduction) of the disulphide linkages is important in achieving good quality of the product, and subsequent oxidation is not required. In the case of crumpet batters, however, the same maturation is sought as in a bread dough, and both reduction and oxidation are required.

The present invention is based on the discovery that plants of the families Cruciferae, Resedaceae, Capparidaceae, and Tropaeolaceae when added, in suitably commituted form, to wheat flour have a valuable improving action generally similar to that obtained by the addition of reducing agents such as cysteine.

The present invention accordingly provides an improving agent for wheat flour comprising a comminuted non-toxic plant, or plant part, of the family Cruciferae, Resedaceae, Capparidaceae, or Tropaeolaceae, or extract thereof, and one or more of ascorbic acid, potassium bromate, or other oxidizing improving agent or soya bean flour.

As the production of an active extract of one of the aforesaid plants gives rise to considerable practical difficulties, it is preferred to use the comminuted plant or plant part, especially seed, itself. The ground seeds appear generally to contain the desired active principles in the most concentrated form. Preferred genera are Brassica L. and Sinapis L. (both Cruciferous), but plants of other genera, e.g. Crambe L., Nasturtium R. Br., Tropaeolum, or Amoracia Gilib., can also be used. The ground seeds of *Brassica rapus* L. (rape) and *Sinapis alba* L. (white mustard, also called *Brassica alba*) are especially preferred.

The oxidizing improving agent is generally used in a proportion of 1 to 15, preferably 4 to 8, parts by weight per 100 parts by weight of ground seed. An excipient or diluent such as soya bean flour may also be present in an amount, for example, from 1 to 4 times the weight of the ground seed. Wheat flour may also be added to make the product easy to mix in during use.

While it is often preferred to use an oxidizing improving agent as well as the agent based on a plant as aforesaid, it is possible to dispense with the use of the oxidizing improving agent.

The invention therefore also includes within its scope a dough, batter or paste, comprising wheat flour, water and a comminuted non-toxic plant, or plant part, as aforesaid, or extract thereof. The proportion of the last is generally from 0.1 to 10, preferably 1 to 5 ounces per 280 lbs. of wheat flour, depending on the activity of the plant material, but the best amount can readily be found by (A) mixing (i) wheat flour into a dough with (ii) 10 ounces per 100 lbs. of wheat flour is frequently undesirable as it is liable to noticeable flavouring of the final product. While not essential, an oxidizing improving agent may be present in such doughs, batters or pastes in the same proportions as those already mentioned. The use of an oxidizing improver gives a somewhat whiter and more bulky loaf. Generally speaking, except with some unaerated products such as some biscuits, the dough, batter or paste contains yeast or an other raising agent such as sodium bicarbonate alone or in admixture with an acidic salt or a week acid, such as acid calcium phosphate, acid sodium pyrophosphate, gluconic-δ-lactone (which hydrolyses to an acid in use), or cream of tartar.

The present invention is especially important in connection with the production of bread which may be made by (A) mixing (i) wheat flour into a dough with (ii) water, (iii) yeast or other raising agent, (iv) a comminuted non-toxic plant or plant part of the family Cruciferae, Resedaceae, Capparidaceae, or Tropaeolaceae, or extract thereof, and pereferably (v) an oxidizing improver, (B) allowing the said dough to develop, and (C) baking the developed dough.

By making use of the invention the time required for bulk fermentation is eliminated, and dough mixing can be carried out by traditional machinery in a normal mixing time, or on high energy input machines using a reduced time and energy input. Bread produced by the new process has good crust quality and keeps well. While no theoretical explanation of the invention has yet been found, it is believed that enzymes present in the plant material are responsible for, or play an essential part in, the novel effects obtained by the present invention.

The following examples illustrate the invention.

EXAMPLE I

A concentrate is first prepared by mixing together:

12 ozs. active soya flour
4 ozs. malt flour
5 ozs. white mustard flour (i.e., ground seed)
8 g. potassium bromate 1-12 ozs. of white flour may be added if desired as a diluent. This mixture is sufficient to improve 280 lbs. of white flour. The dough is prepared by mixing the concentrate with the following:

280 lbs. white wheat flour (70% extraction 12% gluten)
170 lbs. water (or more or less according to the quality of the flour)
5½ lbs. yeast
4¾–5½ lbs. salt
2–5 lbs. fat The dough is mixed to a final dough temperature of 84–88° F. for 15 to 20 minutes on a slow speed R.V.K. or Artofex machine. The dough is then shaped into dough pieces which are placed in tins within 10 minutes of the end of mixing. If a high speed mixer is used, mixing time may be half of that usually required, or the power required may be reduced.

EXAMPLE II

This recipe contains no oxidant and could be used for sweet buns.

The following ingredients are mixed together at 85° F.

| | lbs. |
|---|---|
| White wheat flour | 100 |
| Water | 65 |
| Sucrose | 10 |
| Fat | 10 |
| Glyceryl monostearate | 15 |
| Milk powder | 3 |
| Yeast | 6 |
| Salt | 3 |

White mustard flour, 1.25 ozs.

These ingredients are mixed together for 8 to 10 minutes on a hook and upright machine. The dough is then allowed to stand for only 3 or 4 minutes before dividing, moulding and placing in tins. The dough is proved at 100° F. and 92% relative humidity and baked as soon as the desired bulk has been attained.

EXAMPLE III

This is a recipe for crumpets in accordance with the invention.

The following ingredients are mixed to form a batter.

Wheat flour (equal weight of special cake flour and "patent" bread flour)—100 lbs.
Water at 75° F.—125 lbs.
Yeast—3 lbs.
Salt—1 lb.
Baking powder (acid calcium phosphate plus sodium bicarbonate)—1.5 lbs.
White mustard flour—65 g.
Potassium bromate—3 g.

The mixture is whisked for six minutes only, and deposited on the hot-plate within ten minutes. The amount of water may be varied if necessary, depending on the gluten content of the flour.

EXAMPLE IV

A concentrate is prepared by mixing the following ingredients.

3 to 4 ozs. active soya flour
3 to 4 ozs. ground rape seed
2 ozs. salt
3 ozs. white wheat flour (70% extraction)
4 ozs. whey powder
½ oz. ammonium chloride
4.5 g. potassium bromate
4.5 g. ascorbic acid These quantities are suitable for addition to 280 lbs. of flour. The dough should be mixed to a final dough temperature of 85° F. and 6 lbs. of yeast should be added. Baking is carried out in conventional manner.

I claim:
1. In a process for the manufacture of a baked product which comprises the successive steps of:
   (a) mixing wheat flour into a dough with water, yeast or other raising agent,
   (b) allowing the dough to develop at the conclusion of said mixing,
   (c) placing the dough in baking pans substantially immediately after development and thereafter baking the dough, the improvement wherein about 1 to about 5 ounces of an additive selected from the group consisting of ground white mustard seed, ground rape seed, an extract of white mustard seed, an extract of rape seed, or mixtures thereof per 280 lbs. of wheat flour is added to the wheat flour during the mixing step (a).

2. In a process according to claim 1 in which the said mixture of ingredients also contains an oxidizing improver selected from the group consisting of potassium bromate, ascorbic acid and mixtures thereof.

3. Process according to claim 2 in which the proportion of oxiding improver is 4 to 8 parts by weight of additive.

References Cited

UNITED STATES PATENTS

| 444,847 | 1/1891 | Pomeroy | 99—140 |
| 2,067,912 | 1/1937 | Frey et al. | 99—91 |

FOREIGN PATENTS

| 119,923 | 10/1918 | Great Britain | 99—93 |

OTHER REFERENCES

DeGoug, "The Bread Tray," recipe 69 on page 57, Greenburg-publisher, New York, 1944.

RAYMOND N. JONES, Primary Examiner

J. R. HOFFMAN, Assistant Examiner

U.S. Cl. X.R.

99—86, 92